United States Patent
Inoue et al.

(10) Patent No.: US 11,768,500 B2
(45) Date of Patent: Sep. 26, 2023

(54) AUTONOMOUS DRIVING SYSTEM

(71) Applicant: TOYOTA JIDOSHA KABUSHIKI KAISHA, Toyota (JP)

(72) Inventors: Go Inoue, Gotenba (JP); Takahiro Yokota, Susono (JP); Yoshinori Watanabe, Isehara (JP); Takaaki Tanaka, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 64 days.

(21) Appl. No.: 16/148,243

(22) Filed: Oct. 1, 2018

(65) Prior Publication Data

US 2019/0155294 A1 May 23, 2019

(30) Foreign Application Priority Data

Nov. 17, 2017 (JP) ................................. 2017-221879

(51) Int. Cl.
*G05D 1/02* (2020.01)
*B60W 50/08* (2020.01)
(Continued)

(52) U.S. Cl.
CPC .......... *G05D 1/0223* (2013.01); *B60W 30/10* (2013.01); *B60W 30/143* (2013.01); *B60W 50/08* (2013.01); *B60W 2050/0075* (2013.01); *B60W 2520/10* (2013.01); *B60W 2520/105* (2013.01); *B60W 2540/10* (2013.01);
(Continued)

(58) Field of Classification Search
CPC .. G05D 1/0223; B60W 30/10; B60W 30/143; B60W 50/08
See application file for complete search history.

(56) References Cited

U.S. PATENT DOCUMENTS

| 8,255,110 B2 | 8/2012 | Taguchi |
| 8,364,394 B2 | 1/2013 | Taguchi |

(Continued)

FOREIGN PATENT DOCUMENTS

| CN | 101795917 A | 8/2010 |
| EP | 3 088 281 A1 | 11/2016 |

(Continued)

OTHER PUBLICATIONS

Translation of the Communication dated May 16, 2019, from the Russian Federal Service for Intellectual Property in counterpart Application No. 2018133851/11.

*Primary Examiner* — Rami Khatib
*Assistant Examiner* — Gabriel Joseph Rene Lambert
(74) *Attorney, Agent, or Firm* — Sughrue Mion, PLLC

(57) ABSTRACT

An autonomous driving system includes an electronic control unit configured to generate, based on a target route, a target path in a predetermined coordinate system and a speed plan specifying a passage time at a control point on the target path, and rebuild, based on an actual speed of a vehicle, the speed plan when an operation intervention is performed during autonomous driving performed by autonomous driving control for causing the vehicle to travel along the target path according to the speed plan, the operation intervention changing a braking force acting on the vehicle, and perform the autonomous driving control by using an actuator mounted on the vehicle.

8 Claims, 6 Drawing Sheets

(51) Int. Cl.
  *B60W 30/10* (2006.01)
  *B60W 30/14* (2006.01)
  *B60W 50/00* (2006.01)
(52) U.S. Cl.
  CPC ..... *B60W 2540/12* (2013.01); *B60W 2540/18* (2013.01); *B60W 2720/103* (2013.01); *B60W 2720/106* (2013.01); *G05D 2201/0213* (2013.01)

(56) References Cited

U.S. PATENT DOCUMENTS

| | | | |
|---|---|---|---|
| 8,428,812 B2* | 4/2013 | Taguchi | B60W 10/08 701/445 |
| 8,660,778 B2 | 2/2014 | Taguchi | |
| 9,067,571 B2 | 6/2015 | Matsunaga | |
| 9,096,266 B2 | 8/2015 | Irie | |
| 9,352,779 B2 | 5/2016 | Kindo et al. | |
| 9,886,852 B2 | 2/2018 | Urano | |
| 10,048,699 B2 | 8/2018 | Inoue et al. | |
| 10,435,022 B2* | 10/2019 | Brandin | B60W 30/16 |
| 2008/0189021 A1* | 8/2008 | Inoue | B60K 31/047 701/93 |
| 2009/0076699 A1 | 3/2009 | Osaki et al. | |
| 2010/0204896 A1* | 8/2010 | Biondo | B60W 30/143 701/93 |
| 2011/0313647 A1* | 12/2011 | Koebler | B60L 3/12 701/123 |
| 2015/0134177 A1* | 5/2015 | Lee | G01C 21/34 701/23 |
| 2015/0329113 A1* | 11/2015 | Carlsson | B60W 30/143 701/93 |
| 2016/0139598 A1 | 5/2016 | Ichikawa et al. | |
| 2016/0339915 A1* | 11/2016 | Kuwahara | B60W 50/10 |
| 2017/0039855 A1* | 2/2017 | Maeda | G08G 1/166 |
| 2017/0120908 A1* | 5/2017 | Oniwa | B60W 50/082 |
| 2017/0168492 A1* | 6/2017 | Shitamoto | G05D 1/0274 |
| 2017/0259819 A1 | 9/2017 | Takeda | |
| 2017/0349174 A1* | 12/2017 | Brandin | B60W 10/06 |
| 2017/0351262 A1 | 12/2017 | Suzuki | |
| 2018/0001892 A1* | 1/2018 | Kim | B60W 40/04 |
| 2018/0345963 A1* | 12/2018 | Maura | G05D 1/0088 |

FOREIGN PATENT DOCUMENTS

| | | |
|---|---|---|
| JP | H07-101326 A | 4/1995 |
| JP | 2009-067358 A | 4/2009 |
| JP | 2016-099713 A | 5/2016 |
| JP | 2016-215745 A | 12/2016 |
| JP | 2017-165153 A | 9/2017 |
| RU | 2481988 C2 | 5/2013 |
| WO | 2009031014 A2 | 3/2009 |
| WO | 2016/110730 A1 | 7/2016 |
| WO | 2016110733 A1 | 7/2016 |
| WO | 2017/110892 A1 | 6/2017 |

\* cited by examiner

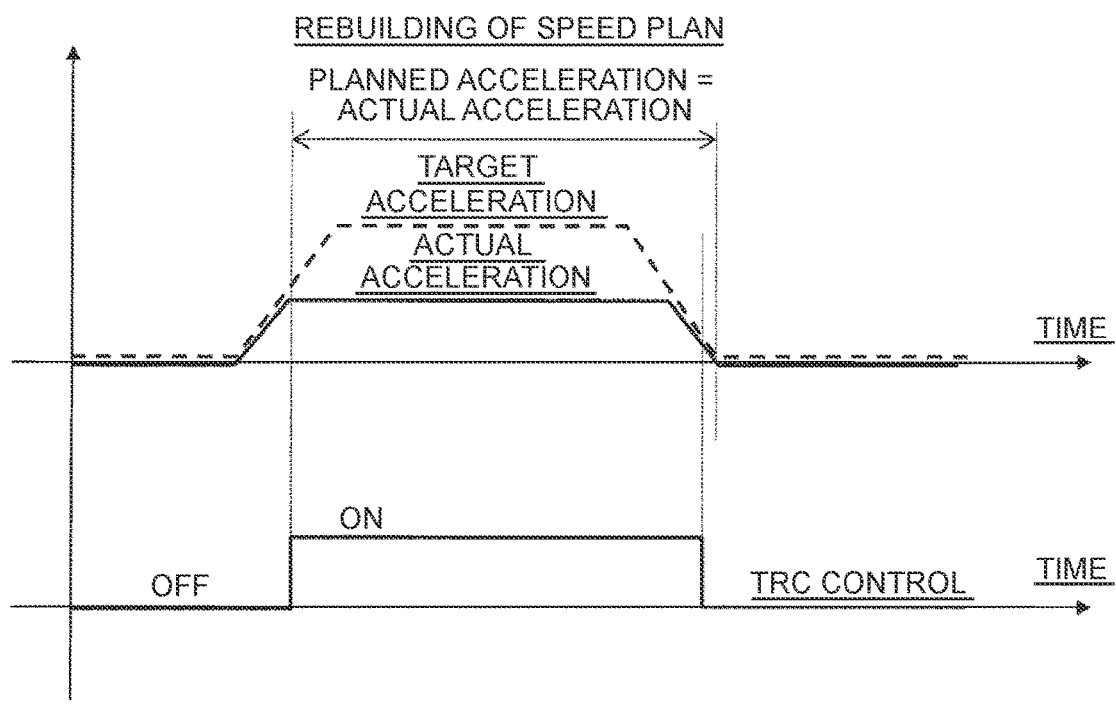
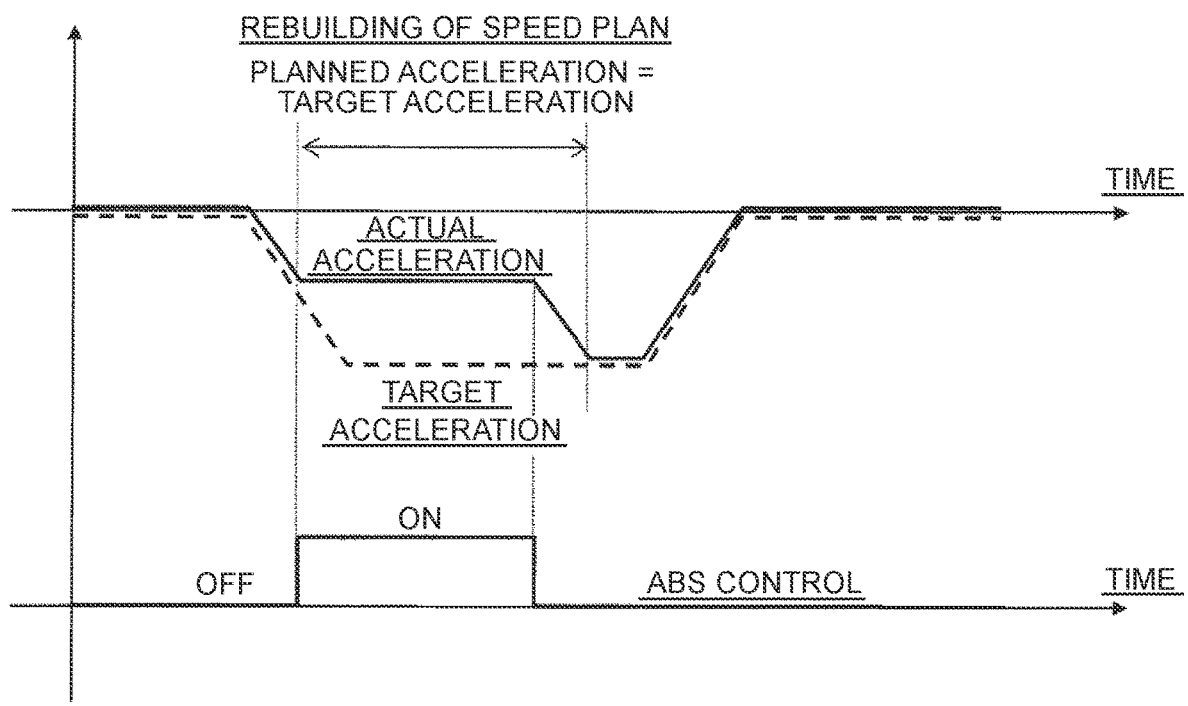

AUTONOMOUS DRIVING SYSTEM

INCORPORATION BY REFERENCE

The disclosure of Japanese Patent Application No. 2017-221879 filed on Nov. 17, 2017 including the specification, drawings and abstract is incorporated herein by reference in its entirety.

BACKGROUND

1. Technical Field

The present disclosure relates to an autonomous driving system.

2. Description of Related Art

Japanese Patent Application Publication No. 2016-099713 (JP 2016-099713 A) discloses an example of a technique relating to an autonomous driving system. The autonomous driving system disclosed in this publication generates a travel plan along a preset target route and, based on the generated travel plan, autonomously controls the traveling of the vehicle.

SUMMARY

In addition to the autonomous driving system, various safety systems for ensuring safety at the time collision or during traveling are mounted on a vehicle, including the Pre-Crash Safety system (PCS), Antilock Brake System (ABS), Traction Control (TRC), and Vehicle Stability Control (VSC). These safety systems operate the brake actuator of the vehicle. When the brake actuator operation of the autonomous driving system interferes with the brake actuator operation of the safety system, the operation of the safety system takes precedence. In addition, even while the autonomous driving system is in operation, the driver can perform the brake operation. The brake operation of the driver also takes precedence over the brake actuator operation of the autonomous driving system. This means that the operation of the safety system and the brake operation of the driver during autonomous driving become an operation intervention in the operation of the brake actuator of the autonomous driving system.

The brake actuator operation of the safety system or the brake operation of the driver changes the braking force acting on the vehicle and, as a result, changes the vehicle speed. Therefore, the safety system operation or the driver's brake operation, if performed during the autonomous driving system operation, changes the speed of the vehicle with the result that a deviation from the travel plan is generated. In the autonomous driving system as disclosed in the technique described above, the traveling of the vehicle is controlled so that the vehicle follows the target path on the assumption that the vehicle will travel at the planned speed. Therefore, when the speed is changed due to the safety system operation or the driver's brake operation, there is a possibility that the vehicle's target-path following capability cannot be maintained or the behavior of the vehicle becomes unstable.

The present disclosure provides an autonomous driving system that can stabilize the behavior of a vehicle while maintaining the vehicle's target-path following capability, even when an operation intervention that may change the braking force acting on the vehicle is performed during autonomous driving.

An aspect of the disclosure provides an autonomous driving system. The autonomous driving system according to the aspect includes an electronic control unit configured to generate, based on a target route, a target path in a predetermined coordinate system and a speed plan specifying a passage time at a control point on the target path, and rebuild, based on an actual speed of a vehicle, the speed plan when an operation intervention is performed during autonomous driving performed by autonomous driving control for causing the vehicle to travel along the target path according to the speed plan, the operation intervention changing a braking force acting on the vehicle, and perform the autonomous driving control by using an actuator mounted on the vehicle.

When an operation intervention that changes the braking force acting on the vehicle is performed during autonomous driving, a difference is generated between the planned speed, determined by the speed plan, and the actual speed. Such a difference causes a deviation in the control points on the target path to be referenced during the autonomous driving control, resulting in a decrease in the vehicle's target-path following capability and in an unstable behavior of the vehicle. The configuration described above allows the speed plan to be rebuilt based on the actual speed even when an operation intervention that changes the braking force acting on the vehicle is performed during autonomous driving. Matching the planned speed to the actual speed by rebuilding the speed plan in this way prevents a decrease in the vehicle's target-path following capability and also prevents an unstable behavior of the vehicle even when such conditions are caused by a difference between the planned speed and the actual speed.

In the aspect, the electronic control unit may be configured to rebuild, based on the actual speed and an actual acceleration of the vehicle, the speed plan when the operation intervention is performed.

In the aspect, the electronic control unit may be configured to rebuild the speed plan by matching a planned speed determined by the speed plan to the actual speed, and by matching a planned acceleration determined by the speed plan to the actual acceleration, when the operation intervention is performed.

The configuration described above further prevents a decrease in the vehicle's target-path following capability and an unstable behavior of the vehicle.

In the aspect, the electronic control unit may be configured to match a planned speed determined by the speed plan to the actual speed while the operation intervention is being performed, and rebuild, when the operation intervention is terminated, the speed plan such that the planned speed is gradually increased from an actual speed at a time when the operation intervention is terminated.

The configuration described above can prevent an unstable behavior of the vehicle caused by a sudden change in the acceleration after the operation intervention is terminated.

In the aspect, the electronic control unit may be configured to rebuild, based on a target acceleration determined by the autonomous driving control and the actual speed of the vehicle, the speed plan when the operation intervention is an operation of ABS.

In the aspect, the electronic control unit may be configured to rebuild the speed plan by matching a planned acceleration determined by the speed plan to the target acceleration determined by the autonomous driving control, and by matching a planned speed determined by the speed plan to the actual speed, when the operation intervention is the operation of ABS.

The configuration described above prevents a decrease in the vehicle's target-path following capability and prevents an unstable behavior of the vehicle while ensuring the maximum degree of deceleration achievable under the constraints of the road surface environment.

As described above, even when an operation intervention that may change the braking force acting on a vehicle is performed during autonomous driving, the autonomous driving system according to the present disclosure can stabilize the behavior of the vehicle while maintaining the vehicle's target-path following capability.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 7 is a diagram showing a method of rebuilding a travel plan when the TRC is in operation; and FIG. 8 is a diagram showing a method of rebuilding a travel plan when the ABS is in operation.

DETAILED DESCRIPTION OF EMBODIMENTS

Figure 1:
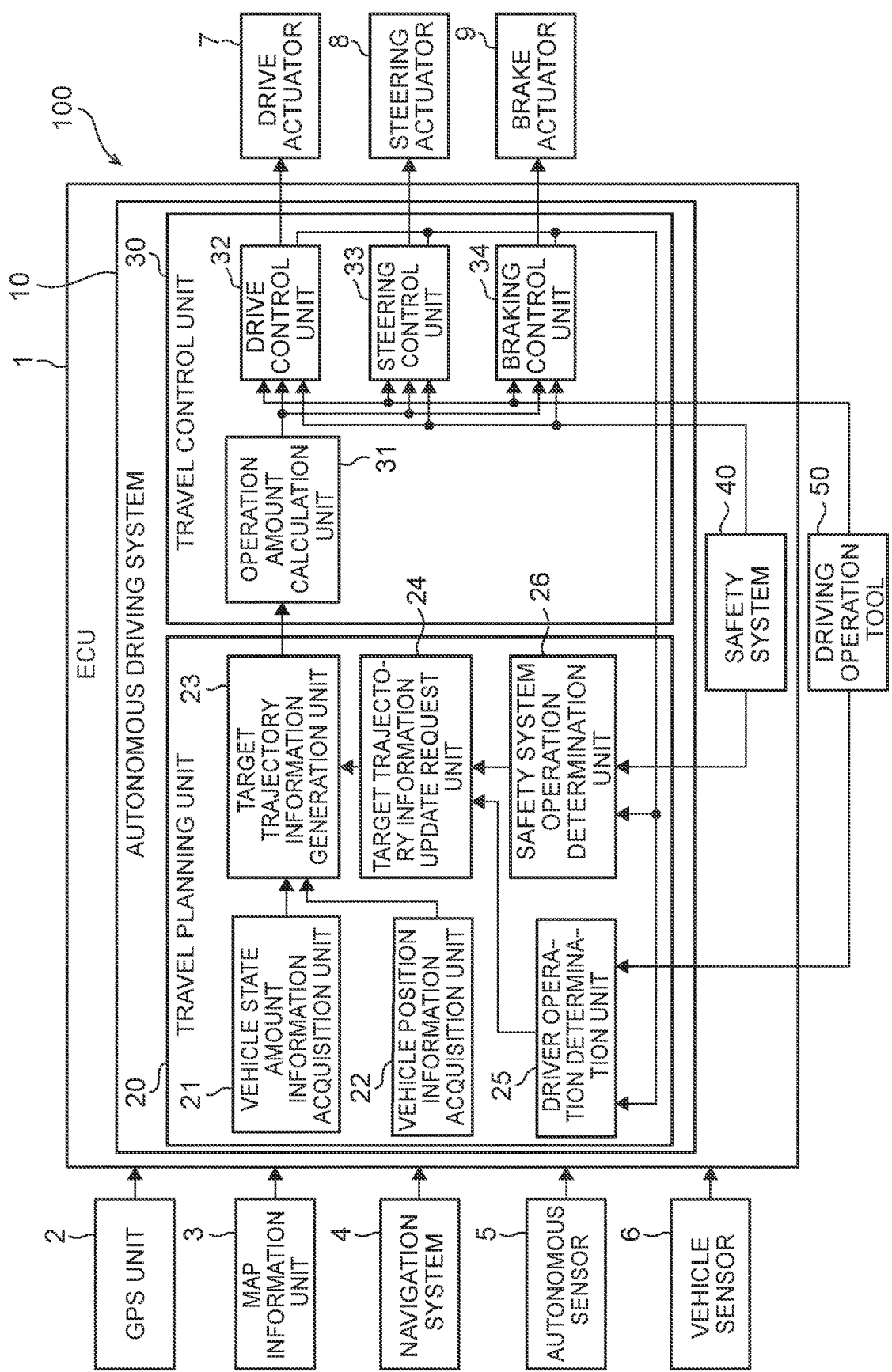
FIG. 1 is a block diagram showing a configuration of a control system of an autonomous driving vehicle on which an autonomous driving system according to an embodiment of the present disclosure is mounted.

An embodiment of the present disclosure will be described in detail below with reference to the drawings. When a number (the number of elements, a quantity, an amount, the number of ranges, etc.) is mentioned in the description of the embodiment below, the present disclosure is not limited to the mentioned number unless otherwise specified explicitly or unless otherwise identified clearly to the number in principle. In addition, the structure described in the following embodiment is not necessarily indispensable to the present disclosure unless otherwise specified explicitly or unless otherwise identified clearly in principle.

1. Configuration of the Control System of an Autonomous Driving Vehicle

An autonomous driving system in the embodiment of the present disclosure is a control system for autonomous driving mounted on an autonomous driving vehicle. For example, the autonomous driving system is a control system that can realize an autonomous driving level 3 or higher in the level definitions of Society of Automotive Engineers (SAE). An autonomous driving vehicle on which the autonomous driving system in this embodiment is mounted has a control system having the configuration shown in the block diagram in FIG. 1.

An autonomous driving vehicle 100 includes an Electronic Control Unit (ECU) 1 that functions as the control device. The ECU 1 is a computer having at least one processor and at least one memory. The ECU 1 can implement various functions by executing the programs, stored in the memory, by the processor. The implemented functions include at least the function of an autonomous driving system 10 and the function of a safety system 40. The detail of the autonomous driving system 10 will be described later.

The safety system 40 includes the PCS that is a safety system for ensuring safety at the time of collision and the ABS, TRC, and VSC that are safety systems for ensuring safety during traveling. The PCS is a system that predicts a collision with an object ahead and performs the vehicle control for assisting in avoiding collision or for reducing collision damages. The ABS is a system that prevents the wheels from locking up at the time of braking to ensure the operability of the steering wheel. The TRC is a system that reduces wheel slippage at a start time or an acceleration time to ensure stability. The VSC is a system that reduces the side skidding of wheels to ensure stability. These safety systems 40, provided separately from the autonomous driving system 10, control at least the braking force of the vehicle.

To the input unit of the ECU 1, a GPS unit 2, a map information unit 3, and a navigation system 4 are connected. The GPS unit 2 is a unit that acquires the position information indicating the current position of the vehicle, based on the GPS signals. The ECU 1 can know the current position of the vehicle based on the position information provided from the GPS unit 2. In this specification, a "vehicle" means a host vehicle on which the autonomous driving system 10 is mounted unless otherwise specified. The map information unit 3 is, for example, a database formed in a storage unit such as an HDD or an SSD mounted on the vehicle. The map information stored in the map information unit 3 includes, for example, the road position information, road shape information, position information on the intersections and branch points, and road lane information. The GPS unit 2 and the map information unit 3 are connected also to the navigation system 4.

The navigation system 4 is a device that guides the vehicle to a destination that the driver specifies on the map. The navigation system 4 calculates a target route to the destination, based on the position information on the vehicle measured by the GPS unit 2 and the map information stored in the map information unit 3 and outputs the calculated target route to the ECU 1. Note that, when the ECU 1 is connectable to the Internet, the map information may be stored in, and the target route may be calculated by, a server on the Internet.

To the input unit of the ECU 1, an autonomous sensor 5 and a vehicle sensor 6 are also connected. The autonomous sensor 5 is a sensor that acquires the information on the surrounding environment, and the surrounding objects, of the vehicle. The autonomous sensor 5 includes, for example, at least one of a lidar (LIDAR: Laser Imaging Detection and Ranging), a millimeter wave radar, and a camera. The vehicle sensor 6 is a sensor that acquires the information on the operation state of the vehicle. The vehicle sensor 6 includes, for example, a speed sensor for measuring the traveling speed of the vehicle based on the rotation speed of the wheels, an acceleration sensor for measuring the acceleration acting on the vehicle, a yaw rate sensor for measuring the turning angular velocity of the vehicle, and a steering angle sensor for measuring the steering angle.

Furthermore, the ECU 1 receives the signal corresponding to the operation amount of a driving operation tool 50 operated by the driver. The driving operation tool includes, for example, the brake pedal, the accelerator pedal, and the steering wheel.

To the output unit of the ECU 1, a drive actuator 7 for driving the vehicle, a steering actuator 8 for steering the vehicle, and a brake actuator 9 for braking the vehicle are connected. The drive actuator 7 includes, for example, an engine, an EV system, a hybrid system, and a fuel cell system. The steering actuator 8 includes, for example, a power steering system, a steer-by-wire steering system, and a rear wheel steering system. The brake actuator 9 includes, for example, a hydraulic brake and a power regenerative brake. These actuators 7, 8 and 9 operate according to the operation command values sent from the ECU 1.

2. Configuration of the Autonomous Driving System

FIG. 1 is a detailed block diagram showing the functions when the ECU 1 operates as the autonomous driving system 10. The functions of the autonomous driving system 10 will be described below.

The autonomous driving system 10 includes a travel planning unit 20 and a travel control unit 30. The travel planning unit 20 is configured to build a travel plan for causing the vehicle to travel along a target route calculated by the navigation system 4. The travel control unit 30 is configured to perform autonomous driving control according to the travel plan built by the travel planning unit 20. Note that the autonomous driving control includes the speed control and the steering control.

More specifically, the travel planning unit 20 includes a vehicle state amount information acquisition unit 21, a vehicle position information acquisition unit 22, a target trajectory information generation unit 23, a target trajectory information update request unit 24, a driver operation determination unit 25, and a safety system operation determination unit 26. First, the vehicle state amount information acquisition unit 21, the vehicle position information acquisition unit 22, and the target trajectory information generation unit 23 will be described. The target trajectory information update request unit 24, the driver operation determination unit 25, and the safety system operation determination unit 26 will be described after the description of the travel control unit 30.

The vehicle state amount information acquisition unit 21 acquires the information on the state amount of the vehicle from the vehicle sensor 6. The state amount of the vehicle includes the speed, the acceleration in the longitudinal direction, the yaw rate, and the steering angle. The vehicle position information acquisition unit 22 acquires the information on the position of the vehicle from the GPS unit 2. The position of the vehicle, which is a position on the map stored in the map information unit 3, is represented in the absolute coordinate system. When the autonomous sensor 5 includes a camera, the position of the vehicle on the map is corrected by aligning the photographed image, captured by the camera, with a landmark included in the map information.

The target trajectory information generation unit 23 acquires the target route calculated by the navigation system 4, the state amount of the vehicle acquired by the vehicle state amount information acquisition unit 21, and the position of the vehicle acquired by the vehicle position information acquisition unit 22. Based on the acquired information, the target trajectory information generation unit 23 generates a travel plan for causing the vehicle to travel along the target route. The generation of a travel plan includes the generation of a target path and the generation of a speed plan.

A target path, which is a path along which the vehicle is to travel in several seconds or in several tens of seconds, is set along the target route. More specifically, a target path is a path formed by connecting the target positions of the vehicle in a predetermined coordinate system; for example, a target path is represented by a set of control points each represented by an X coordinate and a Y coordinate. The coordinate system representing a target path may be an absolute coordinate system used as the coordinate system for displaying a map or a vehicle coordinate system, created specifically for a vehicle, in which the X axis indicates the width direction of the vehicle and the Y axis indicates the traveling direction.

A speed plan is the specification of the passage times of the vehicle at the control points on a target path. When the passage time of the vehicle at each control point is determined while the vehicle sequentially passes through the control points, the passing speed is uniquely determined. This means that the specification of the passage time of the vehicle at each control point on a target path is equivalent to the specification of the passing speed of the vehicle at each control point on the target path. A speed plan can also be represented as a speed pattern in which a planned speed is set for each control position on in relation to the time. In addition, a speed plan may include an acceleration pattern in which a planned acceleration is set for each control position in relation to the time.

Figure 2:
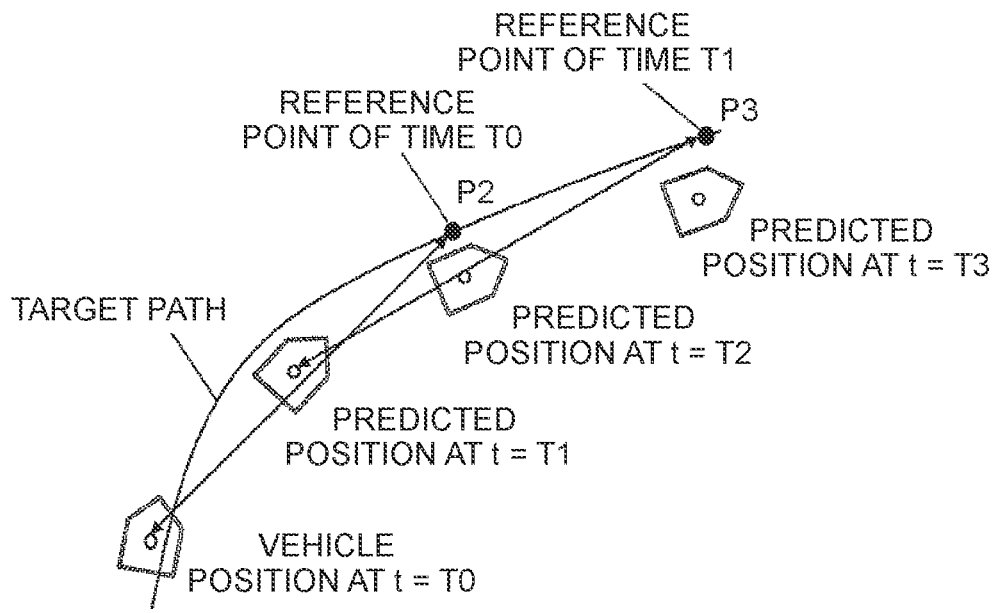
FIG. 2 is a diagram showing an example of a travel plan generated in the autonomous driving system according to the embodiment of the present disclosure and the calculation of an operation amount required for autonomous driving control.

FIG. 2 is a diagram showing an example of a travel plan generated by the target trajectory information generation unit 23. FIG. 2 shows a target path, the current position of the vehicle, and the predicted positions of the vehicle, all of which are represented in the absolute coordinate system. The current position of the vehicle is the position of the vehicle at time t=T0. The predicted positions are the positions of the vehicle where the vehicle is predicted to be positioned in the future. In FIG. 2, the predicted positions of the vehicle at times t=T1, T2, and T3 are shown. The predicted positions of the vehicle are calculated from the speed plan, the current position of the vehicle, and the current state amount of the vehicle.

Returning again to FIG. 1, the description of the target trajectory information generation unit 23 will be continued. The target trajectory information generation unit 23 combines the generated target path and the speed plan into the target trajectory information. The target path specifies the position whereas the target trajectory information, created by combining the speed plan with the target path, is the information that specifies the position and the time. The target trajectory information generation unit 23 supplies the generated target trajectory information to the travel control unit 30. In addition, the target trajectory information generation unit 23 repeatedly generates the target trajectory information at a predetermined periodic interval (for example, at a periodic interval of several hundred milliseconds) based on the latest information. The interval between the times T0, T1, T2, and T3 shown in FIG. 2 corresponds to this periodic interval.

Next, the travel control unit 30 will be described. The travel control unit 30 includes an operation amount calculation unit 31, a drive control unit 32, a steering control unit 33, and a braking control unit 34. The operation amount calculation unit 31 calculates an operation amount for autonomous driving, based on the target trajectory information supplied from the target trajectory information generation unit 23. The operation amount calculated by the operation amount calculation unit 31 includes the operation amount for the speed control and the operation amount for the steering control. More specifically, the operation amount of each of the drive actuator 7, the brake actuator 9, and the steering actuator 8 is calculated by the operation amount calculation unit 31. An example of the operation amount calculation method used by the operation amount calculation unit 31 will be described with reference to FIG. 2.

The operation amount calculation unit 31 determines the operation amount based on the feedforward control and the feedback control so that the vehicle travels along the target path according to the speed plan. More specifically, the control point on the target path corresponding to the time that is a predetermined time ahead of the current time is set as the reference point. In the example shown in FIG. 2, control point P2 at time T2, which is two intervals ahead of current time T0, is determined as the reference point of time T0. When the reference point is determined, the feedforward value of the operation amount at time T0 is calculated from the parameter corresponding to that reference point. The parameter referenced in calculating the feedforward value is, for example, the curvature of the target path. In addition, the feedback correction amount of the operation amount at time T0 is calculated from the parameter indicating the magnitude of a deviation between the reference point of time T0 and the predicted position at time T2 and from the parameter indicating the trend. The parameter referenced in calculating the feedback correction amount is, for example, the deviation in the lateral direction (deviation amount in the width direction of the vehicle) and the deviation in the yaw angle. The operation amount calculation unit 31 calculates the sum of the feedforward value and the feedback correction amount as the operation amount at time T0.

Returning again to FIG. 1, the description of the travel control unit 30 will be continued. The operation amount of the drive actuator 7, calculated by the operation amount calculation unit 31, is supplied to the drive control unit 32. The operation amount of the steering actuator 8 is supplied to the steering control unit 33. Similarly, the operation amount of the brake actuator 9 is supplied to the braking control unit 34. The drive control unit 32, the steering control unit 33, and the braking control unit 34 convert the operation amount, supplied from the operation amount calculation unit 31, into an operation command value and sends the operation command value to the actuators 7, 8, and 9, respectively.

Note that the control units 32, 33, and 34 also accept the operation amount of the actuators 7, 8, and 9 requested by the safety system 40. For example, when the PCS operates, the braking control unit 34 accepts the operation amount that the PCS requires the brake actuator 9 to apply in order to avoid collision or to reduce collision damage. Similarly, when the ABS operates, the braking control unit 34 accepts the operation amount that the ABS requires the brake actuator 9 to apply in order to prevent the wheels from locking up.

In addition, the control unit 32, 33, 34 accept the operation amount of the actuators 7, 8, and 9 that the driver requests via an operation on the driving operation tool 50. For example, when the driver performs the brake operation, the braking control unit 34 accepts the operation amount of the brake actuator 9 calculated by converting the operation amount of the brake pedal.

Each of the control units 32, 33, and 34 adds up the operation amount calculated by the operation amount calculation unit 31, the operation amount requested by the safety system 40, and the operation amount requested by the driver through an operation on the driving operation tool 50, or mediates between those operation amounts. In mediating the operation amounts, the operation amount requested by the safety system 40 and the operation amount requested by the driver take precedence over the operation amount calculated by the operation amount calculation unit 31, that is, the operation amount requested by the autonomous driving system 10. Therefore, the operation of the safety system 40 or the operation on the driving operation tool 50 by the driver, if performed during the execution of autonomous driving, becomes an operation intervention in the operation of the actuators 7, 8, and 9 performed by the autonomous driving system 10.

Note that, when an operation intervention by the operation of the safety system 40 or an operation intervention by the brake operation of the driver is performed during the execution of autonomous driving, the speed of the vehicle is changed with the result that a deviation from the travel plan occurs. The autonomous driving system 10 in this embodiment has the function that addresses this problem. Before describing this function, the problem with a travel plan in an autonomous driving system in the comparative example, where the conventional autonomous driving control is applied, will be described with reference to FIG. 3.

Figure 3:
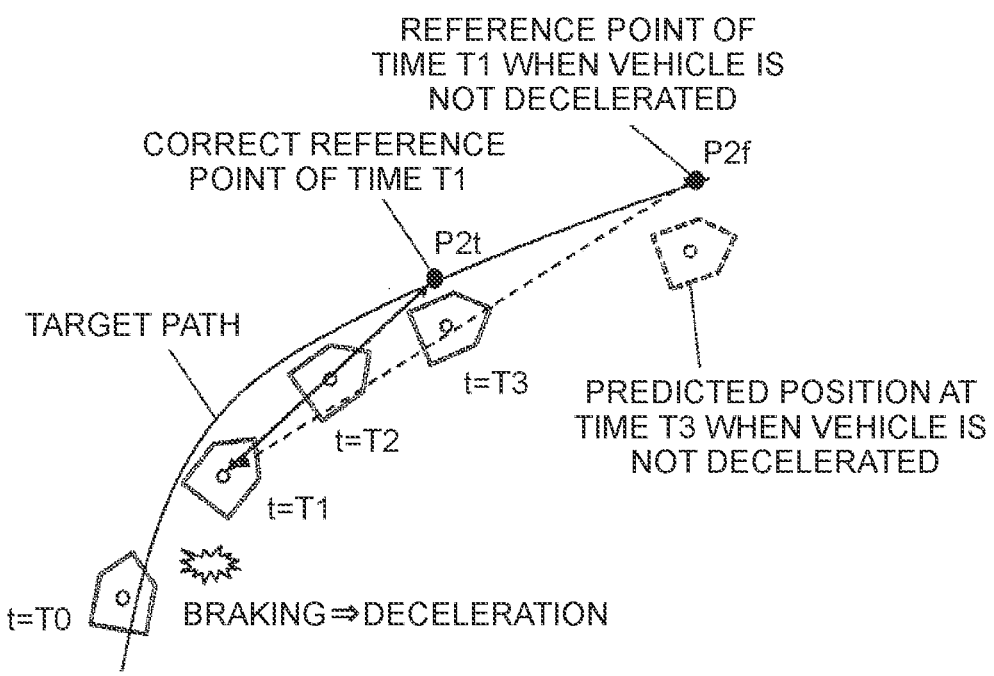
FIG. 3 is a diagram showing a problem with a travel plan in an autonomous driving system in a comparative example.

As shown in FIG. 3, assume that the brake operation is performed by the driver between time T0 and time T1 to brake the vehicle. As a result, the vehicle is decelerated by the brake operation with deviation between the actual speed of the vehicle and the planned speed determined by the speed plan. The reference point of time T1, which is referenced in the calculation of the operation amount, is the control point on the target path at time T3 that is two intervals ahead. Note that, in the autonomous driving system in the comparative example, the travel plan is generated on the assumption that the vehicle is traveling always at the planned speed. Therefore, in the autonomous driving system in the comparative example, the control point P2f, corresponding to the predicted position (indicated by a dotted line) at time T3 that is the predicted position when the vehicle is not decelerated, is determined as the reference point of time T1.

However, when the vehicle is decelerated, the correct predicted position of the vehicle at time T3 is the position indicated by the solid line. In this case, the control point P2t, corresponding to that correct predicted position, is the correct reference point of time T1. Therefore, when the operation amount is calculated with the control point P2f as the reference point of time T1, there arises a problem that an appropriate feedforward value cannot be obtained or that the feedback correction amount becomes excessive. This problem arises a possibility that the vehicle's target-path following capability cannot be maintained or that the behavior of the vehicle becomes unstable.

Returning again to FIG. 1, the function prepared in the autonomous driving system 10 in this embodiment to address the above problem will be described. The target trajectory information update request unit 24, the driver operation determination unit 25, and the safety system operation determination unit 26 included in the travel planning unit 20 are a part of the function prepared to address the problem described above. The function of these units will be described below.

The driver operation determination unit 25 checks the operation command value that is sent from each of the control units 32, 33, and 34 to each of the actuators 7, 8, and 9, respectively, and the signal that is issued when the driver operates the driving operation tool 50 in order to determine whether the operation intervention that changes the braking force acting on the vehicle has been performed by the driver. More specifically, the driver operation determination unit 25 determines whether the brake operation has been performed. If it is determined that the brake operation has been performed by the driver, the driver operation signal is sent from the driver operation determination unit 25 to the target trajectory information update request unit 24.

The safety system operation determination unit 26 checks the operation command value that is sent from each of the control unit 32, 33, and 34 to each of the actuators 7, 8, and 9, respectively, and the signal that is issued when the safety system 40 outputs the operation amount, in order to determine whether the operation intervention that changes the braking force acting on the vehicle has been performed by the safety system 40. If it is determined that the operation intervention has been performed by the operation of the safety system 40, the safety system operation signal is sent from the safety system operation determination unit 26 to the target trajectory information update request unit 24.

The target trajectory information update request unit 24 requests the target trajectory information generation unit 23 to update the target trajectory information if the driver operation signal or the safety system operation signal is received. The update of the target trajectory information is to rebuild the travel plan, more specifically, to rebuild the speed plan included in the travel plan.

When the update of the target trajectory information is requested, the target trajectory information generation unit 23 rebuilds the speed plan based on the actual speed of the vehicle measured by the vehicle sensor 6. More specifically, the target trajectory information generation unit 23 corrects the planned speed to the current actual speed and re-sets the relationship between the position of each control point on the target path and the passage time at that position. When a planned acceleration is set for each control position in relation to the time, the target trajectory information generation unit 23 also corrects the planned acceleration at each control point to the actual acceleration. An example of the method for rebuilding a travel plan by the target trajectory information generation unit 23 will be described with reference to FIG. 4A and FIG. 4B.

Figure 4A:
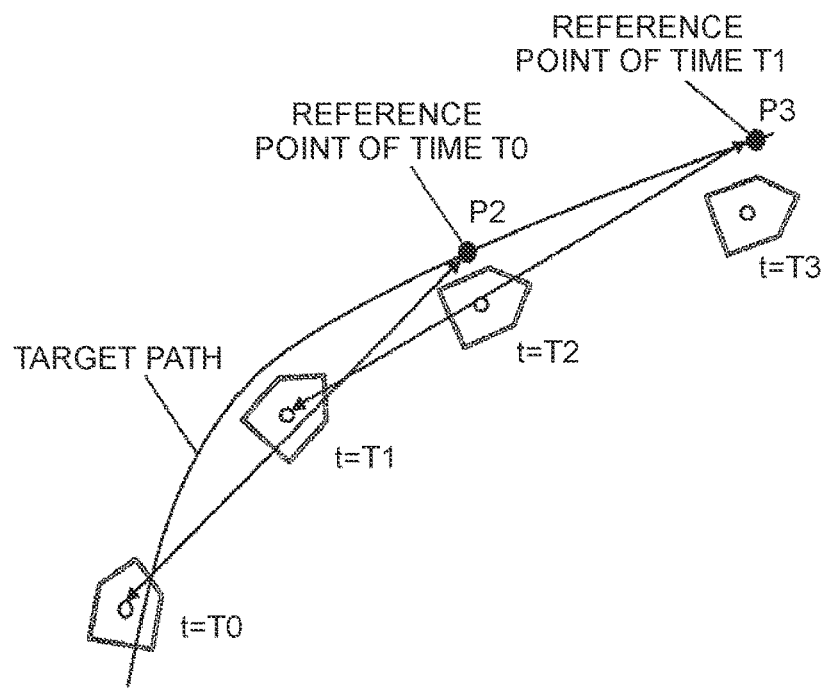
FIG. 4A is a diagram showing a target path, the current position of a vehicle, and the predicted positions of the vehicle in a normal driving state in which a travel plan is not rebuilt.
Figure 4B:
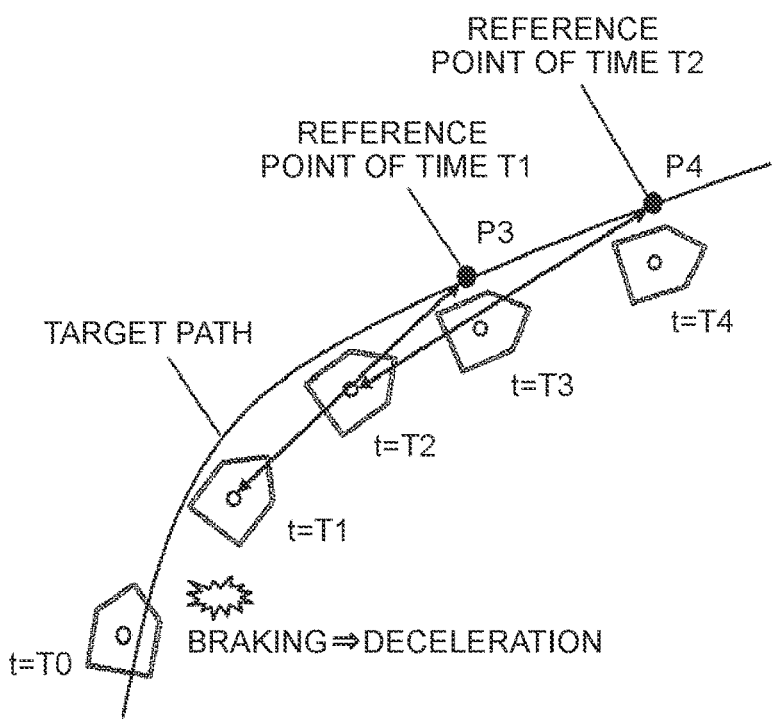
FIG. 4B is a diagram showing a method of rebuilding a travel plan and an effect thereof in the autonomous driving system according to the embodiment of the present disclosure.

FIG. 4A shows a target path, the current position of a vehicle, and the predicted positions of the vehicle in a normal driving state in which braking is not activated by the driver's brake operation or by the operation of the safety system 40. On the other hand, FIG. 4B shows a target path, the current position of a vehicle, and the predicted positions of the vehicle at a deceleration time when the braking is activated by the driver's brake operation or by the operation of the safety system 40. When the vehicle is decelerated by braking, a deviation occurs in the predicted positions of the vehicle due to a change in the speed. For example, assume that the driver performs the brake operation between time T0 and time T1 to brake the vehicle. In this case, the comparison between FIG. 4A and FIG. 4B indicates that a deviation occurs between the predicted positions of the vehicle at deceleration time and the predicted positions at normal time at time T1 immediately after the braking and the subsequent times.

In this embodiment, when an operation intervention that changes the braking force acting on the vehicle is performed during autonomous driving, the planned speed determined by the speed plan is matched to the actual speed and, based on the actual speed, the relationship between the control points on the target path and the passage times is re-set. Therefore, the predicted positions of the vehicle after time T1, at which the vehicle is decelerated, are correctly calculated. After that, the control point P3 corresponding to the predicted position of the vehicle at the correctly calculated time T3 is determined as the reference point of time T1. Similarly, the control point P4 corresponding to the predicted position of the vehicle at correctly calculated time T4 is determined as the reference point of the time T2. Rebuilding the travel plan in this way prevents a decrease in the vehicle's target-path following capability and prevents an unstable behavior of the vehicle even when there is a difference between the planned speed and the actual speed. The operation intervention that changes the braking force acting on the vehicle includes, for example, the brake operation performed by the driver and the operation performed by the safety system. The safety system includes, for example, the PCS, ABS, VSC, and TRC.

3. An Example of the Travel Plan Rebuilding Method

Figure 5:
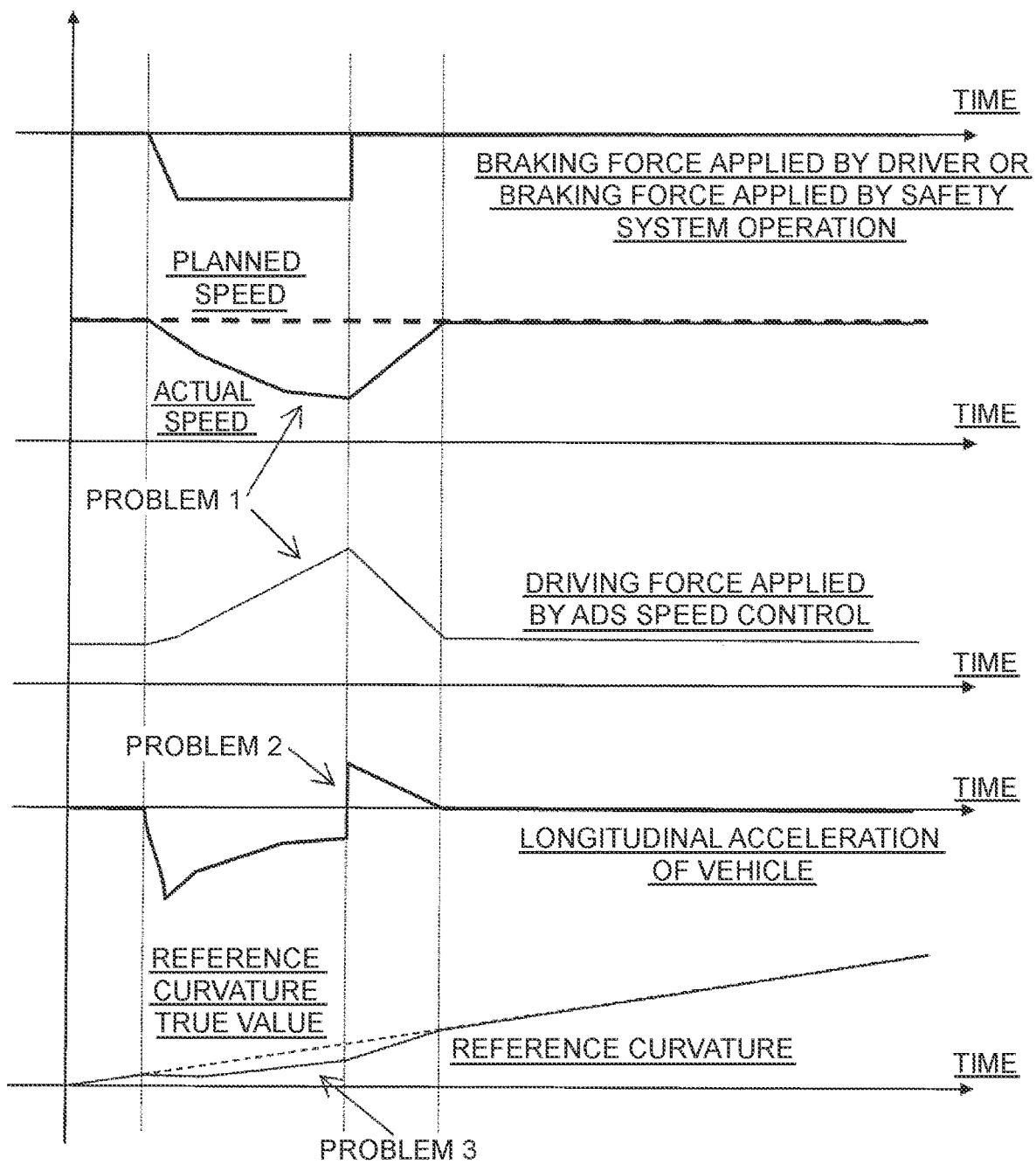
FIG. 5 is a diagram showing an example of the behavior of a vehicle in the autonomous driving system in a comparative example.

An example of the travel plan rebuilding method performed by the autonomous driving system 10 in this embodiment will be described by comparing the behavior of a vehicle between the autonomous driving system 10 in this embodiment and the autonomous driving system in the comparative example. First, an example of the behavior of a vehicle in the autonomous driving system in the comparative example will be described with reference to FIG. 5. FIG. 5 is a timing diagram showing a temporal change in the parameters related to the behavior of a vehicle in the autonomous driving system in the comparative example. In the figure, the following parameters are shown from top to bottom: the braking force applied by the brake operation of the driver or the operation of the safety system, the planned speed and the actual speed, the driving force applied by the speed control (ADS speed control) of the autonomous driving system, the longitudinal acceleration of the vehicle, and the reference curvature and the reference curvature true value.

In the autonomous driving system in the comparative example, a difference is generated between the planned speed and the actual speed, for example, when the driver performs the brake operation and the braking force acts on the vehicle. Since the speed control of the autonomous driving system includes the feedback control, the driving force is increased by operating the driving actuator for reducing the difference between the planned speed and the actual speed. As a result, as indicated by Problem 1 in the figure, the braking force generated randomly, for example, by the driver's brake operation interferes with the driving force applied by the speed control of the autonomous driving system.

After that, when the braking force is suddenly decreased while the braking force and the driving force are interfering with each other, a sudden change occurs in the longitudinal acceleration of the vehicle, as indicated by Problem 2 in the figure. The sudden change in the longitudinal acceleration causes the vehicle to behave unstably and gives a discomfort to the occupant.

In addition, in the autonomous driving system in the comparative example, the curvature determined based on the assumption that the vehicle is traveling at the planned speed is referenced by the steering control. Therefore, when the planned speed and the actual speed differ from each other, an error occurs between the reference curvature that is referenced by the steering control and the reference curvature true value that is the true curvature to be referenced, as indicated by Problem 3 in the figure. Similarly, an error occurs between the true value and the value referenced by the steering control in the lateral deviation and in the yaw angle deviation. These errors lead to a decrease in the vehicle's target-path following capability and to a sudden steering operation that results in an unstable behavior of the vehicle.

Figure 6:
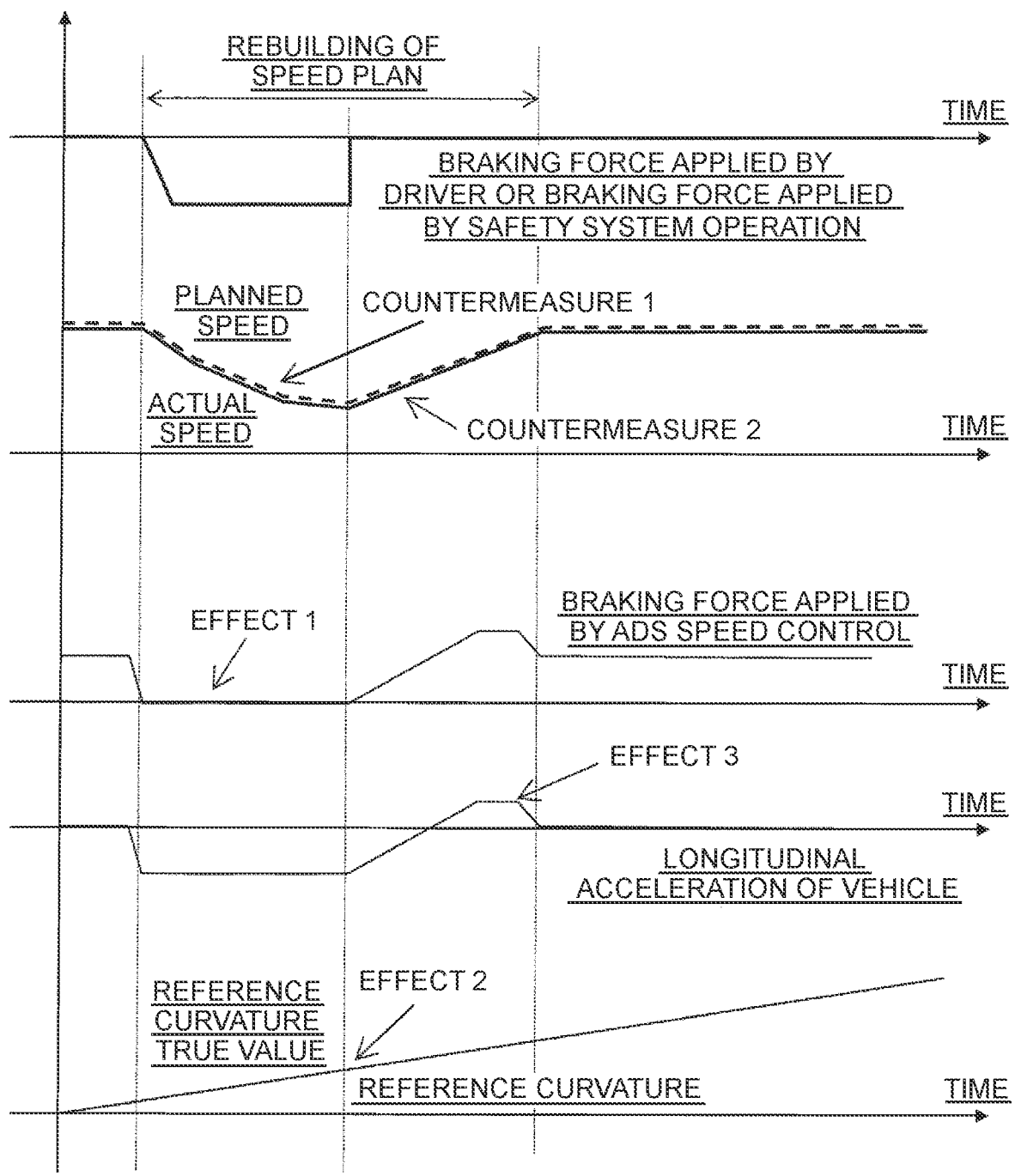
FIG. 6 is a diagram showing an example of a method for rebuilding a travel plan and an example of the behavior of the vehicle in the autonomous driving system according to the embodiment of the present disclosure.

Next, an example of the behavior of a vehicle controlled by the autonomous driving system 10 in this embodiment will be described with reference to FIG. 6. FIG. 6 is a timing diagram showing a temporal change in the parameters related to the behavior of the vehicle in the autonomous driving system 10 in this embodiment. The following parameters are shown from top to bottom: the braking force applied by the brake operation of the driver or the operation of the safety system 40, the planned speed and the actual speed, the driving force applied by the speed control (ADS speed control) of the autonomous driving system, the longitudinal acceleration of the vehicle, and the reference curvature and the reference curvature true value.

When an operation intervention, such as a driver's brake operation, occurs and the braking force acts on the vehicle, the autonomous driving system 10 in this embodiment rebuilds the speed plan. In rebuilding the speed plan, the planned speed is matched to the actual speed, which is reduced by the braking force while the braking force is applied, as indicated by Countermeasure 1. Matching the planned speed to the actual speed in this way eliminates the difference between the planned speed and the actual speed and disables the feedback control of the speed control. As a result, there is no interference between the braking force and the driving force applied by the speed control of the autonomous driving system, as indicated by Effect 1 in the figure. Note that, while the planned speed is matched to the actual speed by rebuilding the travel plan, the integral value or the learned value of the feedback control of the speed control and the steering control is reset or held.

In addition, since there is no difference between the planned speed and the actual speed, there is no difference between the reference curvature, referenced by the steering control, and the reference curvature true value that is the true curvature to be referenced, as indicated by Effect 2 in the figure. The same is true of the lateral deviation and the yaw angle deviation. Referencing an appropriate reference value in the steering control makes it possible to maintain the vehicle's target-path following capability and the stability of the behavior.

As a method for improving the vehicle's target-path following capability and the behavior stability, the method for adjusting the feedback gain of the steering control is known. However, when the feedback gain is increased, the vehicle's target-path following capability is increased but the stability of the behavior is decreased. Conversely, when the feedback gain is decreased, the behavior of the vehicle is stabilized but the vehicle's target-path following capability is decreased. In contrast, the method for rebuilding the travel plan described above ensures both the vehicle's target-path following capability and the behavior stability of the vehicle.

After that, when the operation intervention, such as the brake operation of the driver, is terminated and the braking force is no longer applied to the vehicle, the speed plan is built so that the planned speed is gradually increased from the actual speed at that time to the speed before the operation intervention was performed, as indicated by Countermeasure 2 in the figure. That is, the speed plan that gradually accelerates the vehicle is built. A gradual increase in the planned speed gradually increases the actual speed accordingly. Such a speed plan reduces a sudden change in the longitudinal acceleration of the vehicle after a sudden decrease in the braking force, as indicated by Effect 3 in the figure, thus allowing the behavior of the vehicle to stabilized.

One of the known methods for reducing a sudden change in the longitudinal acceleration is to change the driving force gradually. Gradually changing the driving force in this way prevents the longitudinal acceleration from being changed suddenly after a sudden decrease in the braking force; however, gradually changing the driving force makes it more difficult for the actual speed to quickly reach the planned speed. As a result, the problem caused by the difference between the planned speed and the actual speed remains unsolved. In contrast, the method for rebuilding the travel plan described above allows the difference between the planned speed and the actual speed to be reduced while reducing a sudden change in the longitudinal acceleration after a sudden decrease in the braking force.

4. Rebuilding a Travel Plan During ABS Operation

Finally, an example of the method for rebuilding a travel plan when the ABS is operated will be described below. There is a difference between the method for rebuilding a travel plan when the ABS is operated and the method for rebuilding a travel plan when another safety system 40 is operated. With the TRC as an example of another safety systems 40, the following compares the method for rebuilding a travel plan when the ABS is operated and the method for rebuilding a travel plan when the TRC is operated.

FIG. 7 is a diagram showing the relationship between the target acceleration determined by the autonomous driving control and the actual acceleration realized by the operation of the TRC. In the normal operation time when the TRC is not operating, the planned acceleration determined by the speed plan is set equal to the target acceleration. When the TRC is operated and the vehicle is braked, the actual acceleration is kept lower than the target acceleration with the result that the speed of the vehicle is changed. This will cause the autonomous driving system 10 to start rebuilding the travel plan. In rebuilding a travel plan during the operation of the TRC, the speed plan is rebuilt in such a way that the planned speed is matched to the actual speed and the planned acceleration is matched to the actual acceleration. Rebuilding the travel plan in this way prevents a decrease in the vehicle's target-path following capability and prevents an unstable behavior of the vehicle.

On the other hand, FIG. 8 is a diagram showing the relationship between the target acceleration determined by the autonomous driving control and the actual acceleration realized by the operation of the ABS. In the normal operation time when the ABS is not operating, the planned acceleration determined by the speed plan is set equal to the target acceleration. Since the ABS is operated when the vehicle is braked by the autonomous driving control, the target acceleration at that time is a negative acceleration. As the ABS is operated and the braking force acting on the vehicle is reduced, the actual acceleration becomes smaller than the target acceleration with the result that the speed of the vehicle is changed. This will cause the autonomous driving system 10 to start rebuilding the travel plan.

In rebuilding a travel plan during the operation of the ABS, the speed plan is rebuilt in such a way that the planned speed is matched to the actual speed and the planned acceleration is matched to the target acceleration determined by the autonomous driving control. The ABS is operated when the required deceleration cannot be realized due to the constraints of the road surface environment. If the planned acceleration is matched to the actual acceleration under such circumstances, the required deceleration cannot be realized when the road surface environment is recovered. Therefore, during the ABS operation, the planned acceleration is kept matched to the target acceleration instead of being matched to the actual acceleration. This prevents a decrease in the vehicle's target-path following capability and prevents an unstable behavior of the vehicle while ensuring the maximum degree of deceleration achievable under the constraints of the road surface environment.

What is claimed is:

1. An autonomous driving system comprising:
an electronic control unit configured to
generate a target path represented by a set of control points in a predetermined coordinate system and a speed plan specifying a passage time or passage speed at the control points on the target path,
perform autonomous driving of a vehicle by an autonomous driving control for causing the vehicle to travel along the target path,
when an operation intervention is performed by a driver during the autonomous driving that changes a braking force acting on the vehicle and changes an actual speed of the vehicle, rebuild, based on the actual speed of the vehicle, the speed plan by re-setting a relationship between i) a position of each of the control points on the target path and (ii) the passage time or passage speed at the position of each of the control points,
wherein the speed plan is rebuilt such that, a planned speed of the speed plan built before the operation intervention is changed to match the actual speed that occurs while the operation intervention is being performed, and then the planned speed is gradually increased from a time when the operation intervention is terminated until a predicted vehicle position at a predetermined passage time on the target path, and
perform the autonomous driving control based on the rebuilt speed plan by using an actuator mounted on the vehicle.

2. The autonomous driving system according to claim 1, wherein
the electronic control unit is further configured to rebuild the speed plan, based on an actual acceleration of the vehicle, when the operation intervention is performed.

3. The autonomous driving system according to claim 2, wherein
the electronic control unit is further configured to rebuild the speed plan by matching a planned acceleration determined by the speed plan to the actual acceleration, when the operation intervention is performed.

4. The autonomous driving system according to the claim 1, wherein the relationship between (i) the position of each of the control points on the target path and (ii) the passage time or passage speed at the position of each of the control points on the target path, is re-set so that the target path generated before the intervention is maintained.

5. An autonomous driving method, comprising:
generating, using an electronic control unit (ECU), a target path represented by a set of control points in a predetermined coordinate system and a speed plan specifying a passage time or passage speed at the control points on the target path,
performing autonomous driving of a vehicle by an autonomous driving control for causing the vehicle to travel along the target path,
when an operation intervention is performed by a driver during the autonomous driving that changes a braking force acting on the vehicle and changes an actual speed of the vehicle, rebuilding, using the ECU, based on the actual speed of the vehicle, the speed plan by re-setting a relationship between i) a position of each of the control points on the target path and (ii) the passage time or passage speed at the position of each of the control points,
wherein the speed plan is rebuilt such that, a planned speed of the speed plan built before the operation intervention is changed to match the actual speed that occurs while the operation intervention is being performed, and then the planned speed is gradually increased from a time when the operation intervention is terminated until a predicted vehicle position at a predetermined passage time on the target path, and
performing the autonomous driving control based on the rebuilt speed plan by using an actuator mounted on the vehicle.

6. The autonomous driving method according to claim 5, further comprising:
rebuilding the speed plan, based on the actual speed and an actual acceleration of the vehicle, when the operation intervention is performed.

7. The autonomous driving system method according to claim 6, further comprising:
rebuilding the speed plan by matching a planned acceleration determined by the speed plan to the actual acceleration, when the operation intervention is performed.

8. The autonomous driving method according to the claim 5, wherein the relationship between (i) the position of each of the control points on the target path and (ii) the passage time or passage speed at the position of each of the control points on the target path, is re-set so that the target path generated before the intervention is maintained.

* * * * *